United States Patent
Lee et al.

(10) Patent No.: US 11,818,421 B2
(45) Date of Patent: Nov. 14, 2023

(54) METHOD AND DEVICE FOR SWITCHING MEDIA SERVICE CHANNELS

(71) Applicants: SK TELECOM CO., LTD., Seoul (KR); SK BROADBAND CO., LTD., Seoul (KR)

(72) Inventors: Dai Boong Lee, Seoul (KR); Youn Kwon Kim, Seoul (KR); Sang Ho Bae, Seoul (KR); Gun Woo Kim, Yongin-si (KR); Jeong Mee Moon, Seongnam-si (KR)

(73) Assignees: SK Telecom Co., Ltd., Seoul (KR); SK Broadband Co., Ltd., Seoul (KR)

( * ) Notice: Subject to any disclaimer, the term of this patent is extended or adjusted under 35 U.S.C. 154(b) by 0 days.

(21) Appl. No.: 17/170,070

(22) Filed: Feb. 8, 2021

(65) Prior Publication Data
US 2021/0168437 A1    Jun. 3, 2021

Related U.S. Application Data

(63) Continuation of application No. PCT/KR2019/005341, filed on May 3, 2019.

(30) Foreign Application Priority Data

Nov. 8, 2018  (KR) .................. 10-2018-0136464
Nov. 8, 2018  (KR) .................. 10-2018-0136465
Mar. 28, 2019 (KR) .................. 10-2019-0036243

(51) Int. Cl.
*H04N 21/438* (2011.01)
*H04N 21/231* (2011.01)
(Continued)

(52) U.S. Cl.
CPC ..... *H04N 21/4384* (2013.01); *H04N 21/2393* (2013.01); *H04N 21/23106* (2013.01);
(Continued)

(58) Field of Classification Search
CPC ......... H04N 21/4384; H04N 21/23106; H04N 21/2393; H04N 21/4302; H04N 21/4331; H04N 21/64322
(Continued)

(56) References Cited

U.S. PATENT DOCUMENTS 8,355,450 B1 * 1/2013 Eshet ................. H04N 21/4384
                                                    375/240.01
8,488,066 B2   7/2013 Gao
(Continued)

FOREIGN PATENT DOCUMENTS

EP      2566128 B1     4/2018
KR   10-2009-0054757 A  6/2009
(Continued)

OTHER PUBLICATIONS

PCT International Search Report and Written Opinion, PCT Application No. PCT/KR2019/005341, dated Aug. 21, 2019, 15 pages.

*Primary Examiner* — Alfonso Castro
(74) *Attorney, Agent, or Firm* — WTA Patents

(57) ABSTRACT

Embodiments relate to a method and a device for switching media service channels, which minimize the time required to detect the first I frame for a switch channel by utilizing a caching server when switching channels in an IP-based media service, such as IPTV, and at the same time, minimize the time required for synchronization by changing time information in caching information transmitted from the caching server, such that channel switching between media service channels can be performed more quickly.

9 Claims, 14 Drawing Sheets

(51) Int. Cl.
  *H04N 21/239* (2011.01)
  *H04N 21/43* (2011.01)
  *H04N 21/433* (2011.01)
  *H04N 21/643* (2011.01)

(52) U.S. Cl.
  CPC ..... *H04N 21/4302* (2013.01); *H04N 21/4331* (2013.01); *H04N 21/64322* (2013.01)

(58) Field of Classification Search
  USPC .......................................................... 725/115
  See application file for complete search history.

(56) References Cited

U.S. PATENT DOCUMENTS

| | | | | |
|---|---|---|---|---|
| 2005/0080904 | A1* | 4/2005 | Green | H04N 21/2387 709/227 |
| 2006/0230176 | A1* | 10/2006 | Dacosta | H04L 65/612 709/235 |
| 2007/0011343 | A1* | 1/2007 | Davis | H04L 47/2416 709/231 |
| 2007/0121629 | A1* | 5/2007 | Cuijpers | H04L 12/1859 370/390 |
| 2007/0214490 | A1* | 9/2007 | Cheng | H04N 21/4305 725/135 |
| 2008/0022320 | A1* | 1/2008 | Ver Steeg | H04N 21/4384 725/78 |
| 2008/0301745 | A1* | 12/2008 | Liu | H04N 21/4384 725/110 |
| 2009/0013362 | A1* | 1/2009 | Liu | H04N 21/4384 725/110 |
| 2009/0135828 | A1 | 5/2009 | Sim et al. | |
| 2010/0036962 | A1* | 2/2010 | Gahm | H04L 65/80 709/231 |
| 2010/0202509 | A1* | 8/2010 | Thompson | H04N 21/23805 375/240.01 |
| 2012/0030707 | A1* | 2/2012 | Cedervall | H04N 7/17318 725/38 |
| 2012/0246690 | A1* | 9/2012 | Einarsson | H04N 21/23406 725/109 |
| 2018/0234722 | A1* | 8/2018 | Hashimoto | H04N 21/44 |
| 2018/0295411 | A1* | 10/2018 | Xu | H04N 21/439 |
| 2018/0316740 | A1* | 11/2018 | Stockhammer | H04N 21/8456 |
| 2019/0191212 | A1* | 6/2019 | Sljivic | H04L 65/607 |

FOREIGN PATENT DOCUMENTS

| | | |
|---|---|---|
| KR | 10-0914132 A | 8/2009 |
| KR | 10-2010-0051962 A | 5/2010 |
| KR | 100972092 B1 | 7/2010 |
| KR | 10-2011-0043839 A | 4/2011 |
| KR | 10-2011-0070644 A | 6/2011 |
| WO | WO 2020/096148 A1 | 5/2020 |

* cited by examiner (a)

(b)

METHOD AND DEVICE FOR SWITCHING MEDIA SERVICE CHANNELS

CROSS-REFERENCE TO RELATED APPLICATIONS

The present application is a bypass continuation of International PCT Application No. PCT/KR2019/005341, filed on May 3, 2019, which claims priority to Republic of Korea Patent Application No. 10-2018-0136464 filed on Nov. 8, 2018, Republic of Korea Patent Application No. 10-2018-0136465 filed on Nov. 8, 2018 and Republic of Korea Patent Application No. 10-2019-0036243 filed on Mar. 28, 2019, which are incorporated by reference herein in their entirety.

TECHNICAL FIELD

The present disclosure relates to a method and device for switching media service channels. More specifically, it relates to a method and device for optimally controlling a channel switching time in switching between service channels in an IP-based media service such as IPTV.

BACKGROUND

The statements in this section merely provide background information related to the present disclosure and may not constitute prior art.

Recently, the Internet Protocol TV (IPTV) broadcasting service has begun. IPTV broadcasting is also called "Internet multimedia broadcasting," and it is a generic term for broadcasting services provided through an Internet Protocol (IP) network regardless of its name.

Users can use the IPTV service by manipulating the IPTV set-top box through a remote control, similar to the method of using a conventional broadcast service. The IPTV set-top box can be integrated with the TV receiver or be configured as an independent device and operatively connected to the TV receiver.

FIG. 1 is an exemplary diagram illustrating a procedure of channel switching in an IPTV set-top box. In general, IPTV channel switching procedure is composed of procedural time intervals for receiving a channel switching signal (T1), stopping the screen of the existing channel (T2), and maintaining a stopped state until the first screen of a switching target channel (switched channel) is displayed (T2 to T3), presenting, when the switched channel starts to be received, the first screen thereof (T3), and starting to play the channel when preparation for play of the switched channel, such as audio/video synchronization and PCR/PTS alignment, is completed (T4).

In general, the process of receiving the switched channel stream is entered by requesting the switched channel from the time T2. When an initial I frame for the switched channel is received, a corresponding I frame image may be presented at T3. Even if the I frame of the video for the switched channel is found, in order to start playing the stream, playing the stream requires completion of audio/video synchronization with a data packet having the presentation timestamp (PTS), which is presentation time information, in the same time zone and arrangement of the PTS of the video and audio after program clock reference (PCR) time. The time interval for synchronization of audio/video and time information for play of the switched channel is T3 to T4. When the play is ready, the switched channel is played at time T4, and the channel switching procedure is completed.

As described above, the conventional IPTV set-top box channel switching method is inconvenient in that a user must wait for a certain period of time after switching channels to view a broadcast program on another channel. To address this issue, there is a need for a new technology to shorten the delay in channel switching by minimizing each interval of the channel switching procedure, particularly, the time required for reception of switched channel data performed in the interval from T2 to T3 and the time required for synchronization performed in the interval from T3 to T4.

SUMMARY

It is one object of the present disclosure to enable quick processing of broadcast data of a switched channel by minimizing the time required for detection of the first I frame for the switched channel using a caching server in switching channels by an IPTV set-top box and providing feature information of the initial data information about the switched channel as well as the switched channel information to the caching server to allow the caching server to accurately transmit only necessary caching stream data.

It is another object of the present disclosure to enable channel switching between media service channels to be performed more quickly by minimizing the time required for detection of the first I frame for the switched channel using a caching server in switching channels by an IPTV set-top box and minimizing the time required for synchronization by changing the time information in the caching information transmitted from the caching server.

It is another object of the present disclosure to enable channel switching between media service channels to be performed more quickly by minimizing the time required for detection of the first I frame for the switched channel using a caching server in switching channels by an IPTV set-top box and changing the time information in the caching data transmitted from the caching server based on the time information of multicast data.

In accordance with one aspect of the present disclosure, provided is a method of switching channels by an IPTV reception apparatus, the method including: when a request signal for switching to a switching target channel is received, transmitting a service request signal for access to the switching target channel to an IPTV service device; receiving broadcast data of the switching target channel from the IPTV service device in response to the service request signal; transmitting, to a caching server, a caching information request signal containing packet information about the broadcast data and channel information about the switching target channel; receiving caching stream data corresponding to the packet information and the channel information from the caching server in response to the caching information request signal; and processing the caching stream data and outputting an image.

In accordance with another aspect of the present disclosure, provided is a method of switching channels by a caching server, the method including: receiving a caching information request signal containing channel information about a switched channel and packet information about broadcast data of the switched channel from an IPTV reception apparatus; identifying stream data corresponding to the switched channel based on the channel information; selecting data ranging to a specific position section in the stream data as caching stream data for the switched channel based on the packet information; and transmitting the caching stream data to the IPTV reception apparatus.

In accordance with another aspect of the present disclosure, provided is an IPTV reception apparatus including: a service requester configured to transmit a service request signal for access to a switching target channel to an IPTV service device and to receive broadcast data of the switching target channel from the IPTV service device in response to the service request signal; a data processor configured to transmit, to a caching server, a caching information request signal containing packet information about the broadcast data and channel information about the switching target channel and to receive caching stream data corresponding to the packet information and the channel information from the caching server; and an image processor configured to process the caching stream data and output an image.

In accordance with another aspect of the present disclosure, provided is a caching server including: a data receiver configured to receive a caching information request signal containing channel information about a switched channel and packet information about broadcast data of the switched channel from an IPTV reception apparatus; a data identifier configured to identify stream data corresponding to the switched channel based on the channel information; a data selector configured to select data ranging to a specific position section in the stream data as caching stream data for the switched channel based on the packet information; and a data transmitter configured to transmit the caching stream data to the IPTV reception apparatus.

In accordance with another aspect of the present disclosure, provided is a computer program stored in a computer-readable recording medium for execution, in combination with hardware, of operations of: when a request signal for switching to a switching target channel is received, transmitting a service request signal for access to the switching target channel to an IPTV service device; receiving broadcast data of the switching target channel from the IPTV service device in response to the service request signal; transmitting, to a caching server, a caching information request signal containing packet information about the broadcast data and channel information about the switching target channel; receiving caching stream data corresponding to the packet information and the channel information from the caching server in response to the caching information request signal; and processing the caching stream data and outputting an image.

In accordance with another aspect of the present disclosure, provided is a method of switching channels by an IPTV reception apparatus, the method including: when a request signal for switching to a switching target channel is received, transmitting a service request signal for access to the switching target channel to an IPTV service device; receiving broadcast data of the switching target channel from the IPTV service device in response to the service request signal; transmitting, to a caching server, a caching information request signal containing packet information about the broadcast data and channel information about the switching target channel; receiving caching stream data corresponding to the packet information and the channel information from the caching server in response to the caching information request signal; and generating corrected caching stream data by correcting reference time information in the caching stream data based on reference time information in the broadcast data.

In accordance with another aspect of the present disclosure, provided is an IPTV reception apparatus including: a service requester configured to transmit a service request signal for access to a switching target channel to an IPTV service device and to receive broadcast data of the switching target channel from the IPTV service device in response to the service request signal; a data processor configured to transmit, to a caching server, a caching information request signal containing packet information about the broadcast data and channel information about the switching target channel and to receive caching stream data corresponding to the packet information and the channel information from the caching server; and a data corrector configured to generate corrected caching stream data by correcting reference time information in the caching stream data based on reference time information in the broadcast data.

In accordance with another aspect of the present disclosure, provided is a computer program stored in a computer-readable recording medium for execution, in combination with hardware, of operations of: when a request signal for switching to a switching target channel is received, transmitting a service request signal for access to the switching target channel to an IPTV service device; receiving broadcast data of the switching target channel from the IPTV service device in response to the service request signal; transmitting, to a caching server, a caching information request signal containing packet information about the broadcast data and channel information about the switching target channel; receiving caching stream data corresponding to the packet information and the channel information from the caching server in response to the caching information request signal; and generating corrected caching stream data by correcting reference time information in the caching stream data based on reference time information in the broadcast data.

According to the present disclosure, when channels are switched by an IPTV set-top box, the time required for detection of the first I frame for a switched channel may be minimized using a caching server, and feature information of the initial data information about the switched channel as well as the switched channel information may be provided to the caching server to allow the caching server to accurately transmit only necessary caching stream data. Thereby, broadcast data of a switched channel may be more quickly processed.

In addition, according to the present disclosure, when channels are switched by an IPTV set-top box, the time required for detection of the first I frame for the switched channel may be minimized using a caching server and the time required for synchronization may be minimized by changing the time information in the caching information transmitted from the caching serve. Thereby, channel switching between media service channels may be performed more quickly In addition, according to the present disclosure, when channels are switched by an IPTV set-top box, the time required for detection of the first I frame for the switched channel may be minimized using a caching server, and the time information in the caching data transmitted from the caching server may be changed based on the time information of multicast data. Thereby, channel switching between media service channels may be performed more quickly without unnecessary waiting time.

DETAILED DESCRIPTION

Hereinafter, the present disclosure will be described in detail with reference to the accompanying drawings.

In general, in order for an IPTV system to receive data about a switched channel, stream data for a multicast channel of an IPTV service device is requested through a network device of an IPTV set-top box. When the requested stream data starts to be received, an operation of finding audio data in the same presentation time zone as the I frame video data is performed for start of play. Thereafter, when the audio stream synchronized with the first I frame and the respective presentation times are synchronized with a reference time, play for the switched channel starts.

In this regard, in order to minimize the time required to detect the first I frame from the received stream data, a caching server is employed in the present disclosure. That is, in the case of the IPTV system according to the present disclosure, when a channel switching signal is generated, a request for the latest stream data for a switched channel is made to the caching server in the operation of requesting data for the multicast channel of the IPTV service device through the network device of the IPTV set-top box. Thereafter, when the requested stream data starts to be received from the caching server, the stream starting from the I frame data in the corresponding time zone is received, and the I frame data is detected within a shorter time than the stream data received from the media service network and playback starts immediately.

The present disclosure provides a method for reducing the delay time resulting from channel switching by enabling quicker processing of reception of switched channel data in the operation of switching channels using the caching server (Hereinafter, a media service channel switching method according to the first embodiment will be described as an example).

In addition, present disclosure provides a method of controlling and minimizing the time of the interval from T3 to T4 with the optimized data through synchronization and optimization of time information in the stream data transmitted from the caching server to the IPTV set-top box in the channel switching operation using the caching server (hereinafter, a media service channel switching method according to second to third embodiments will be described as an example).

Figure 2:
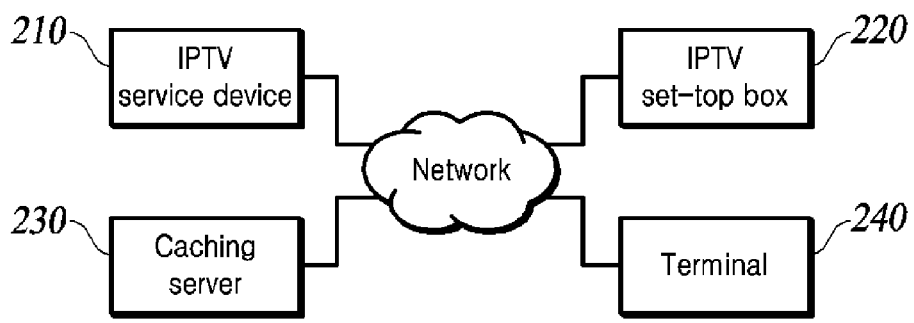
FIG. 2 is a block diagram schematically illustrating an IPTV system for switching media service channels according to the present disclosure.

FIG. 2 is a block diagram schematically illustrating an IPTV system for switching media service channels according to the present disclosure.

As shown in FIG. 2, an IPTV system 200 according to the present disclosure includes an IPTV service device 210, an IPTV set-top box 220, a caching server 230, and a terminal 240.

The IPTV service device 210 is a device configured to receive a plurality of pieces of broadcast content information from a content provider, transmit the received content information to devices such as the IPTV set-top box 220 and the terminal 240 to provides the same to an IPTV subscriber. That is, the IPTV service device 210 receives a plurality of pieces of broadcast content information transmitted from the content provider, distributes the received broadcast content information to the IPTV set-top box 220 and the terminal 240 to provide services such as real-time broadcasting and Video On Demand (VOD) to IPTV subscribers.

Additionally, the IPTV service device 210 according to the present disclosure pre-provides broadcast data corresponding to each service target channel to the caching server 230. The caching server 230 stores the broadcast data of service target channels for a certain period of time, and provides the broadcast data of a channel suitable for a purpose when necessary.

The broadcast data for each channel will be described. Video data for each channel is compression-encoded into an I frame, a P frame, and a B frame, and then formed into a packetized elementary stream (PES). It is generally processed in units of Group Of Pictures (GOP), which includes an I frame, a few P frames and multiple B frames. Audio data is also compression-encoded into an element stream (ES) and then formed into a PES. The video PES and the audio PES are multiplexed and transformed into a transport stream (TS) and then transmitted over a network.

The IPTV set-top box 220 basically connects to a network through a router, and serves to process broadcast data received from the network and output the processed data to the terminal 240.

Upon detecting a channel switching signal according to manipulation of a remote control by a user, the IPTV set-top box 220 performs a channel switching operation such as terminating an existing channel and acquiring information on the switched channel. I other words, when a channel switching signal is generated, the IPTV set-top box 220 makes a request to the IPTV service device 210 for broadcast data for the switched channel through the network device.

Upon receiving information on the initial data of the switched channel from the IPTV service device 210, the IPTV set-top box 220 according to the present disclosure transmits switched channel information to the caching server 230 to makes an additional request for caching information on the channel. At this time, the IPTV set-top box 220 according to the present disclosure additionally provides the caching server 230 with packet information on the initial data of the switched channel together with the switched channel information. This operation may enable the caching server 230 to accurately transmit only necessary caching stream data, thereby minimizing the amount of transferred data for channel switching.

Thereafter, the IPTV set-top box 220 detects the I frame, which is the foremost frame, based on the caching stream data received from the caching server 230, presents the same in phase T3 of the channel switching procedure of the IPTV, and then subsequently operates to play the same in phase T4.

In the second embodiment of the present disclosure, the IPTV set-top box 220 receives corrected caching stream data obtained by correcting the reference time information from the caching server 230. That is, the IPTV set-top box 220 performs a synchronization procedure for audio and video signals based on the corrected reference time information in the corrected caching stream data, such that the required time for synchronization may be minimized compared to the conventional cases. Thereby, channel switching between media service channels may be performed more quickly.

In the third embodiment of the present disclosure, the IPTV set-top box 220 may directly correct the caching stream data transmitted from the caching server 230. That is, the IPTV set-top box 220 generates corrected caching stream data by correcting the reference time information in the caching stream data transmitted from the caching server 230 based on the reference time information in the data of the switched channel transmitted from the IPTV service device 210, and performs a synchronization procedure for audio and video signals based thereon. Accordingly, the IPTV set-top box 220 according to the present disclosure may maintain the same screen synchronization as the conventional channel switching method while performing fast channel switching, and may also address the issue of screen shifting in the conventional methods.

A detailed operation of the IPTV set-top box 220 for playing the switched channel, for example, the procedure of synchronizing audio/video and time information, is the same as in the related art, and thus a detailed description thereof will be omitted.

The caching server 230 serves to receive broadcast data of service target channels from the IPTV service device 210, store the same for a certain period of time, and provide the broadcast data of a channel suitable for a purpose when necessary.

The caching server 230 according to the present disclosure receives a request signal for caching information of a corresponding switched channel from the IPTV set-top box 220 when channel switching to a service target channel occurs.

The caching server 230 calculates stream data corresponding to the switched channel based on the channel information contained in the request signal.

In the present disclosure, packet information about the initial data of the switched channel may be additionally contained in the request signal received from the IPTV set-top box 220 by the caching server 230. Such feature information may be collected at the time when the IPTV set-top box 220 receives the broadcast data of the switched channel from the IPTV service device 210, and may be included in the request signal.

The caching server 230 according to the present disclosure may allow only the minimum data required by the IPTV set-top box 220 in the actual channel switching operation in the stream data corresponding to the switched channel to be transmitted to the IPTV set-top box 220 based on the packet information.

The caching server 230 extracts, as caching stream data, data ranging up to a specific position section determined based on packet information in the stream data corresponding to the channel information, and transmits the same to the IPTV set-top box 220. For example, the caching server 230 determines the end position of a transmitted video based on the packet information transmitted from the IPTV set-top box 220, and operates based on the determination to accurately transmit only necessary caching stream data to the IPTV set-top box 220.

Figure 1:
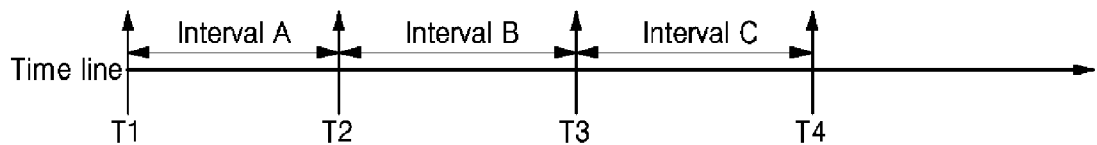
FIG. 1 is a diagram illustrating a procedure for channel switching in a general IP-based media service.

In the second embodiment of the present disclosure, the caching server 230 extracts program clock reference (PCR), which is reference time information included in the caching stream data, and corrects the extracted reference time information to generate correct caching stream data. The operation of generating the corrected caching stream data by the caching server 230 corresponds to the above-described operation of synchronization and optimization of the reference time information in the catching stream data for shortening the time of the interval from T3 to T4 of FIG. 1 and enabling stable play of the service.

In the second embodiment of the present disclosure, based on first previous reference time information closest to the end position of the caching stream data, the caching server 230 corrects other previous reference time information in the caching stream data and generates corrected caching stream data. Thereafter, the caching server 230 transmits, to the IPTV set-top box 220, the corrected caching stream data as caching information corresponding to the channel information.

Figure 3:
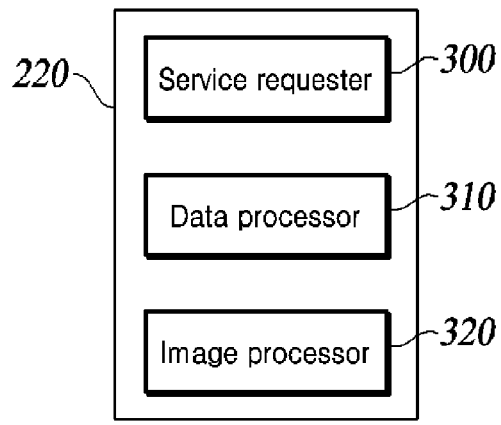
FIG. 3 is a block diagram schematically illustrating an IPTV set-top box according to a first embodiment of the present disclosure.

FIG. 3 is a block diagram schematically illustrating an IPTV set-top box according to the first embodiment of the present disclosure.

As shown in FIG. 3, the IPTV set-top box 220 according to the first embodiment of the present disclosure includes a service requester 300, a data processor 310, and an image processor 320. Here, components included in the IPTV set-top box 220 according to the present embodiment are not necessarily limited thereto. That is, FIG. 3 exemplarily shows only essential components required to complete the reception of the switched channel data, which is performed in the interval from T2 to T3 during the channel switching operation described in FIG. 1, in the minimum time. It should be appreciated that the set-top box 220 may have more or fewer components than those shown in the figure or have different components to implement other functions.

The service requester 300 communicates with the IPTV service device 210 to transmit and receive broadcast data for a service target channel.

Upon recognizing a request for switching from a currently accessed channel to another channel, the service requester 300 according to the present embodiment transmits a service request signal for access to the other channel (=a target switched channel) to the IPTV service device 210.

The service requester 300 receives broadcast data of the switched channel from the IPTV service device 210 in response to the service request signal.

The data processor 310 functions to communicate with the caching server 230 to receive caching stream data for the switched channel.

The data processor 310 transmits a caching information request signal containing channel information about the switched channel to the caching server 230, and receives, in response to the caching information request signal, caching stream data corresponding to the switched channel from the caching server 230.

In transmitting the caching information request signal to the caching server 230, the data processor 310 according to the present disclosure may provide only the switched channel information, or may also provide packet information on broadcast data of the switched channel as additional information.

In the present embodiment, the packet information on the broadcast data may include packet information on the data initially received at the time when the broadcast data of the switched channel is received from the IPTV service device 210 in response to the service request signal from the service requester 300 or corresponding feature information. For example, in the present embodiment, packet information on the broadcast data may include some or all of first N bytes information of the broadcast data received from the IPTV service device 210 through the service requester 300, feature information of the initially received packet data, and packet connection number information.

In consideration of its efficiency, the data processor 310 may transmit, to the caching server 230, a caching information request signal containing the packet information about the broadcast data immediately upon receiving the broadcast data of the switched channel from the IPTV service device 210 through the service requester 300. However, embodiments are not limited thereto.

In the present embodiment, the packet information on the broadcast data is used to accurately indicate the end position of the caching data to be provided to the IPTV set-top box 220 by the caching server 230 to optimize the amount of caching data to be transmitted. In other words, in the present embodiment, the caching server 230 may be allowed to accurately transmit only necessary caching stream data, thereby enabling the broadcast data of the switched channel to be processed more quickly.

More specifically, the data processor 310 receives, as caching stream data, data ranging up to a specific position section determined based on the packet information about the switched channel in the stream data corresponding to the channel information about the switched channel from the caching server 230.

That is, in the present embodiment, the data processor 310 receives caching stream data having, as an end position, a packet identical to the packet information about the broadcast data in the stream data corresponding to the channel information about the switched channel from the caching server 230.

In addition, the data processor 310 receives from the caching server 230 caching stream data whose start position is an I frame immediately preceding the identical packet, or an I frame preceding N (N≥1) frames from the immediately preceding I frame.

A specific method of receiving the caching stream data from the caching server 230 by the data processor 310 will be described in more detail in the part describing the operation of each component of the caching server 230.

The image processor 320 completes channel switching to the switched channel based on the broadcast data and caching stream data for the switched channel received through the service requester 300 and the data processor 310. The operation of the image processor 320 is the same as in the related art, and thus a detailed description thereof will be omitted.

Figure 4:
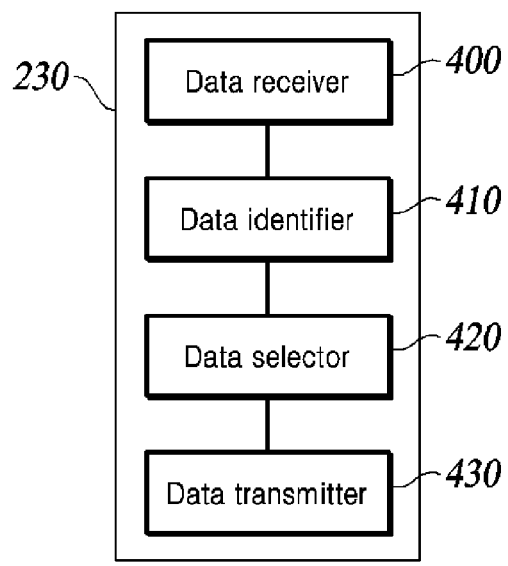
FIG. 4 is a block diagram schematically illustrating a caching server according to the first embodiment of the present disclosure.

FIG. 4 is a block diagram schematically illustrating a caching server according to the first embodiment of the present disclosure.

As shown in FIG. 4, the caching server 230 according to the present embodiment includes a data receiver 400, a data identifier 410, a data selector 420, and a data transmitter 430. Here, components included in the caching server 230 according to the present embodiment are not necessarily limited thereto.

The data receiver 400 receives a caching information request signal corresponding to a switched channel from the IPTV set-top box 220. Here, the caching information request signal received from the IPTV set-top box 220 by the data receiver 400 may include channel information about the switched channel and packet information about broadcast data of the switched channel.

The data identifier 410 identifies stream data corresponding to the switched channel from among previously collected broadcast data for each service target channel, based on the channel information about the switched channel contained in the caching information request signal.

Based on the packet information contained in the caching information request signal, the data selector 420 selects data ranging up to a specific position section in the stream data identified by the data identifier 410 as caching stream data for the switched channel.

Hereinafter, a method of selecting, by the data selector 420, caching stream data for the switched channel based on the information contained in the caching information request signal will be described.

The data selector 420 detects an identical packet identical to the packet information from in the stream data corresponding to the channel information about the switched channel, and determines an end position of the caching stream data based on the identical packet. For example, the data selector 420 may determine the data end section of the identical packet as the end position of the caching stream data.

The data selector 420 determines the start position of the caching stream data based on the nearest I frame in the time before the determined end position data. For example, the data selector 420 may determine an I frame immediately preceding the identical packet as the start position of the caching stream data.

In another embodiment, in order to increase the stability of play of the switched channel in the IPTV set-top box 220, the data selector 420 may determine a frame preceding N (N≥1) frames from an I frame immediately preceding the identical packet as the start position of the caching stream data.

The data transmitter 430 transmits the determined caching stream data to the IPTV set-top box 220.

Figure 5:
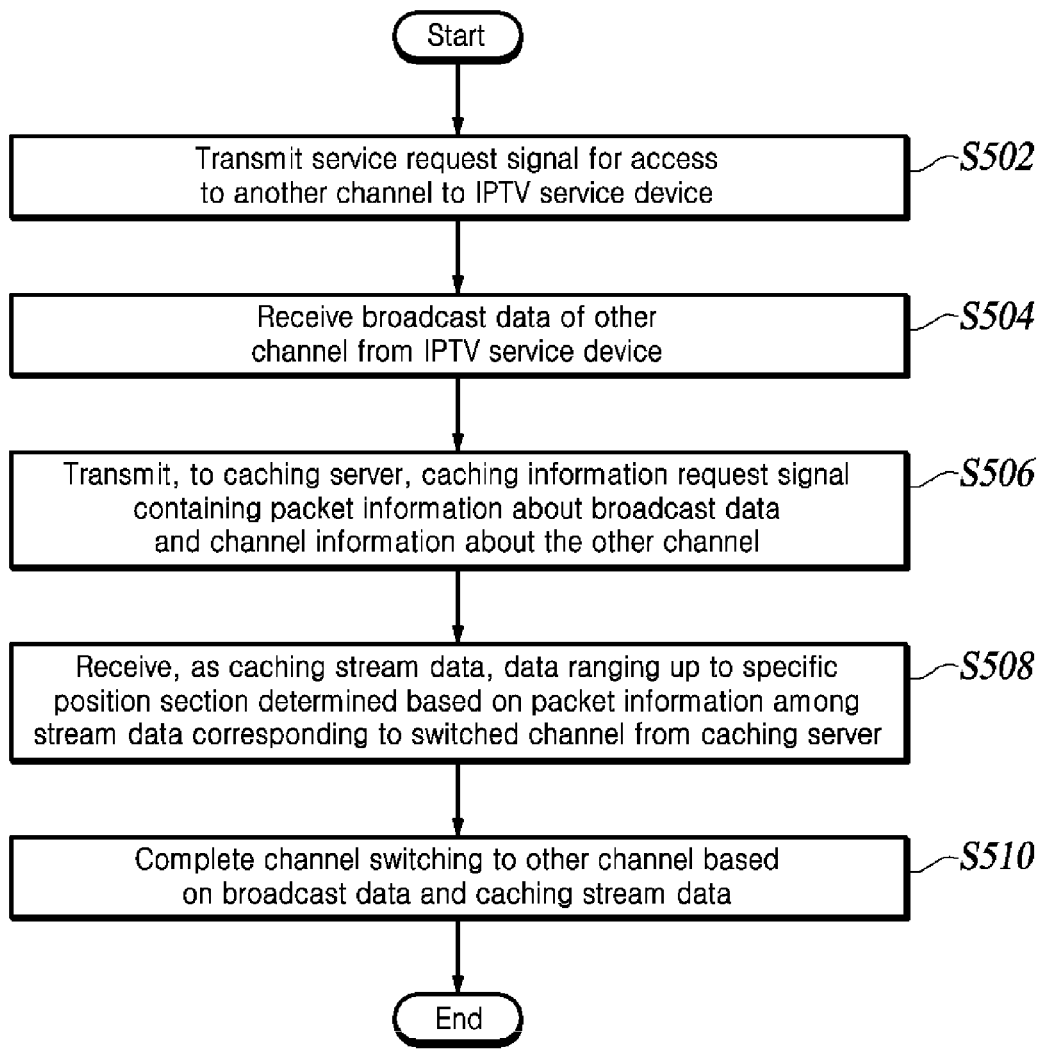
FIG. 5 is a flowchart illustrating a method of switching media service channels of the IPTV set-top box according to the first embodiment of the present disclosure.

FIG. 5 is a flowchart illustrating a method of switching media service channels of the IPTV set-top box according to the first embodiment of the present disclosure.

When a request for switching from a currently accessed channel to another channel is recognized, the IPTV set-top box 220 transmits a service request signal for access to the other channel (=switched channel) to the IPTV service device 210 (S502).

The IPTV set-top box 220 receives broadcast data of the switched channel from the IPTV service device 210 in response to the service request signal of operation S502 (S504).

The IPTV set-top box 220 transmits, to the caching server 230, a caching information request signal containing packet information about the broadcast data and the channel information about the switched channel received in operation S504 (S506). In operation S506, the IPTV set-top box 220 may transmit the caching information request signal to the caching server 230 immediately upon receiving the broadcast data of the switched channel in operation S504.

In response to the caching information request signal of operation S506, the IPTV set-top box 220 receives, as caching stream data, data ranging up to a specific position section determined based on the packet information among stream data corresponding to the switched channel from the caching server 230 (S508). In operation S508, the IPTV set-top box 220 receives caching stream data whose end position is an identical packet identical to the packet information and whose start position is an I frame immediately preceding the identical packet or an I frame preceding N (N≥1) frames from the immediately preceding I frame, in the stream data corresponding to the switched channel.

The IPTV set-top box 220 completes channel switching to the switched channel based on the broadcast data of operation S504 and the caching stream data of operation S508 (S510).

Figure 6:
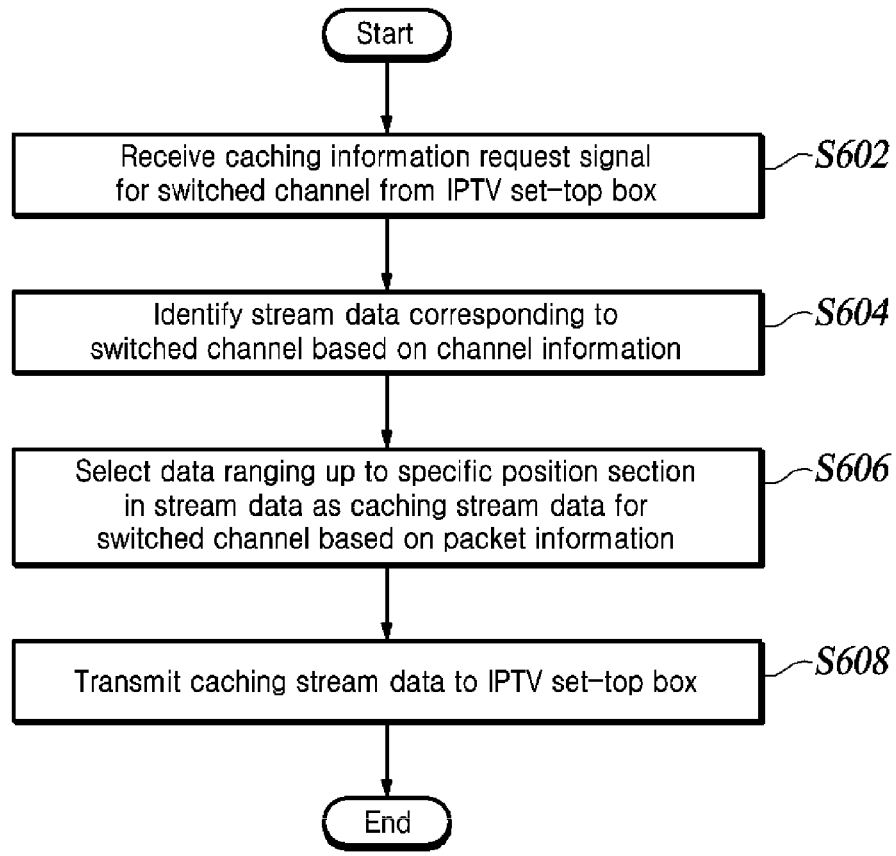
FIG. 6 is a flowchart illustrating a method of switching media service channels of the caching server according to the first embodiment of the present disclosure.

FIG. 6 is a flowchart illustrating a method of switching media service channels of the caching server according to the first embodiment of the present disclosure.

The caching server 230 receives a caching information request signal corresponding to a switched channel from the IPTV set-top box 220 (S602). In operation S602, the caching server 230 receives, from the IPTV set-top box 220, the caching information request signal containing channel information about the switched channel and packet information about broadcast data of the switched channel.

The caching server 230 identifies stream data corresponding to the switched channel based on the channel information in the caching information request signal from operation S602 (S604).

The caching server 230 selects data ranging up to a specific position section in the stream data from operation S604 as caching stream data for the switched channel based on the packet information in the caching information request signal from operation S602 (S606). In operation S606, the caching server 230 determines an identical packet identical to the packet information in the stream data corresponding to the switched channel as the end position of the caching stream data, and determines an I frame immediately preceding the identical packet or an I frame preceding N (N≥1) frames from the immediately preceding I frame as a start position of the caching stream data.

The caching server 230 transmits the caching stream data of operation S606 to the IPTV set-top box 220 (S608).

Figure 7:
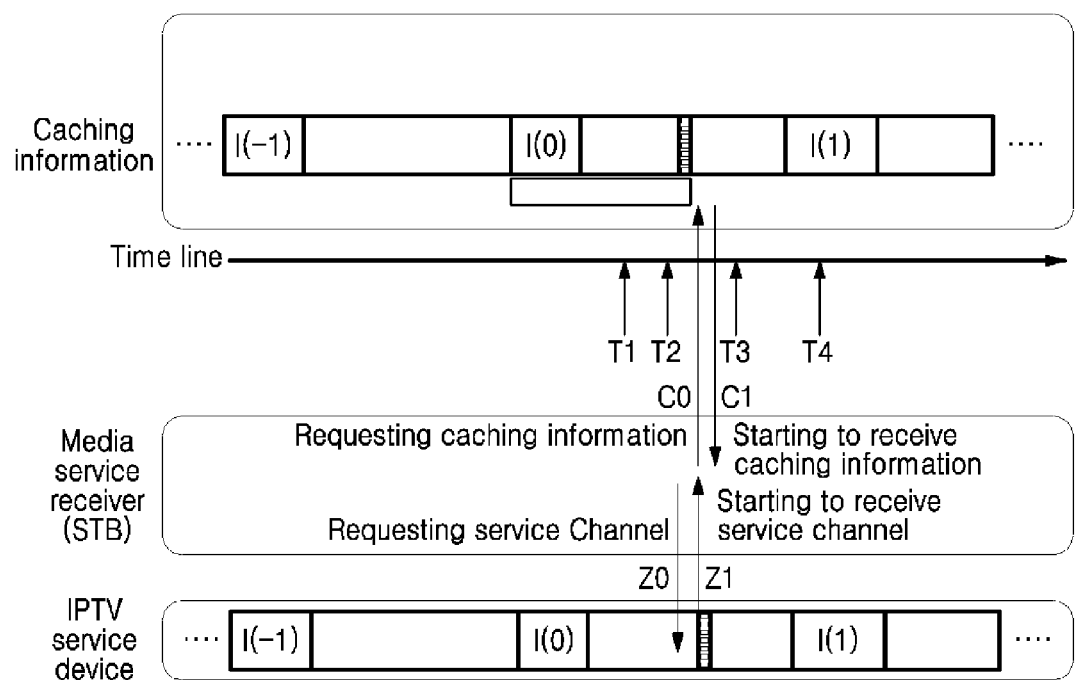
FIGS. 7 and 8 are exemplary diagrams illustrating a method of switching media service channels according to the first embodiment of the present disclosure.
Figure 8:
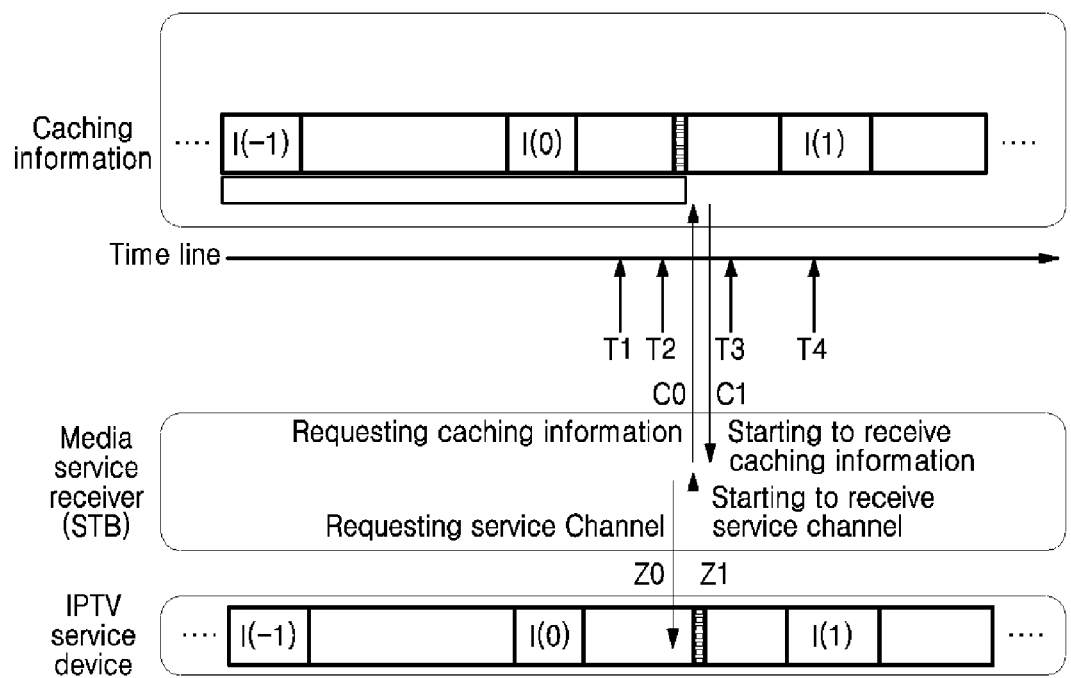

FIGS. 7 and 8 are exemplary diagrams illustrating a method of switching media service channels according to the first embodiment of the present disclosure.

FIG. 7 illustrates a first method of the media service channel switching method according to the first embodiment of the present disclosure, and FIG. 8 illustrates a second method of the media service channel switching method according to the first embodiment of the present disclosure.

Referring to FIGS. 7 and 8, in the media service channel switching method according to the first embodiment of the present disclosure, when a channel switching signal is received (T1), the operations of terminating an existing channel and acquiring information on the switched channel are performed. As a result, the existing channel being viewed is stopped at time T2, and an operation is performed based on the acquired switched channel information to receive switched channel stream data from the IPTV service device (Z0).

As shown in FIG. 7, in the first method of the media service channel switching method according to the first embodiment of the present disclosure, a request for the switched channel is made to the IPTV service device 210 using the information on the switched channel at time point Z0, and the service channel starts to be received at time Z1.

The IPTV set-top box 220 transmits both the information on the switched channel and the initial packet information or corresponding feature information about the data received at Z1 to the caching server 230 at C0.

The caching server 230 finds a packet identical to the initial packet information from the caching information on a channel corresponding to the switched channel information received from the IPTV set-top box 220, and determines the same as the end position of caching stream data to be provided to the IPTV set-top box 220.

The caching server 230 determines the nearest I frame I(0) in the time before the determined end position data as the start position of the caching stream data. In other words, data ranging from the nearest I frame I(0) around the packet identical to the initial packet information or feature information to the packet identical to the initial packet information or the feature information is determined as caching stream data and transmitted to the IPTV set-top box 220.

In the case where data identical to the initial packet information or the feature information has not been cached yet at the time when the caching server 230 determines the end position of the caching data stream based on the initial packet information or the feature information received together with the switched channel information, a specific time may be set to wait for the data to be cached. Then, when caching is performed within the set time, the corresponding data may be determined as the end position.

In addition, the caching server 230 may transmit the caching stream data determined as the start and end positions to the IPTV set-top box 220 without any further operation, or may transmit the same by adding program specific information (PSI) such as a program associate table (PAT) and a precoding matrix indicator (PMI) contained in the corresponding channel stream.

As shown in FIG. 8, in the second method of the media service channel switching method according to the first embodiment of the present disclosure, operations leading up to the operation of determining the end position of the caching stream data to be provided to the IPTV set-top box 220 are the same as those of the media service channel switching method according to the second embodiment of the present disclosure, and there is a difference in determining the start position of the caching stream data. With the second method, stability of play of the switched channel in the IPTV set-top box 220 may be improved.

The caching server 230 determines an I frame I(−1) immediately before the nearest I frame I(0) in the time before the determined end position data preceding the determined end position data as the start position of the caching stream data. That is, data ranging from the I frame I(−1) immediately before the nearest I frame I(0) around the packet identical to the initial packet information or the corresponding feature information to the packet identical to the initial packet information or the corresponding feature information as caching stream data and transmitted to the IPTV set-top box 220.

The start position of the caching stream data may be the I frame I(−1) or I(−2), or an I frame I(−k) preceding a certain number of frames depending on the format of the stream, structure timing, configuration, and the like. The value of k, is an integer, may be set manually or may be determined and automatically applied by the caching server 230 by analyzing the stream of the channel and identifying timing information, audio/video packet configuration, and the like.

Figure 9:
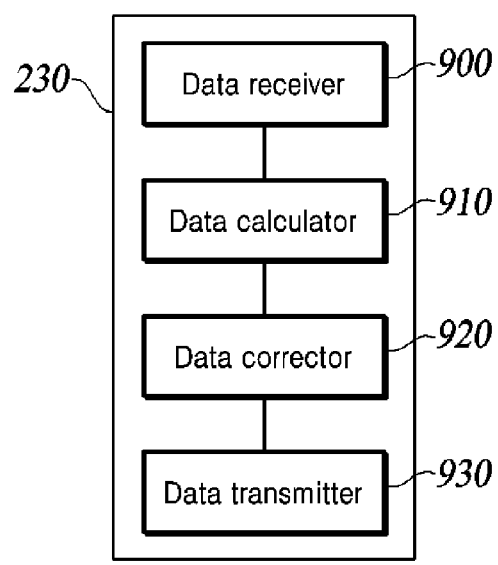
FIG. 9 is a block diagram schematically illustrating a caching server according to a second embodiment of the present disclosure.

FIG. 9 is a block diagram schematically illustrating a caching server according to a second embodiment of the present disclosure.

As shown in FIG. 9, the caching server 230 according to the second embodiment of the present disclosure includes a data receiver 900, a data calculator 910, a data corrector 920, and a data transmitter 930. Here, the operation of the data receiver 900 of the caching server 230 according to the second embodiment of the present disclosure is the same as that of the data receiver 300 of the caching server 230 according to the first embodiment of the present disclosure, and the operation of the data calculator 910 is the same as those of the data identifier 410 and the data selector 420, and thus a detailed description thereof will be omitted.

The data corrector 920 extracts reference time information from the caching stream data calculated through the data calculator 910 and corrects the extracted reference time information to generate corrected caching stream data.

In the second embodiment of the present disclosure, the data corrector 920 generates corrected caching stream data by correcting previous reference time information in the caching stream data based on first previous reference time information nearest the end position of the caching stream data.

Hereinafter, a method of generating the corrected caching stream data by the data corrector 920 by correcting the previous reference time information in the caching stream data based on the first previous reference time information will be described.

First, the data corrector 920 may correct the other previous reference time information in the caching stream data based on the first previous reference time information so as to have the same value as the first previous reference time information.

In another embodiment, in order to minimize the possibility of an error that may be produced in the operation of transmitting the caching stream data, the data corrector 920 may correct the other previous reference time information such that the similarity between the first reference time information and N-th previous reference time information nearest the start position of the caching stream data.

That is, the data corrector 920 may correct the other previous reference time information such that the other previous reference time information has a value sequentially reduced by a specific value based on the value of the first previous reference time information. In the present disclosure, the specific value may be determined differently according to service environment information related to the amount of transferred data and transmission time of the caching stream data.

In the second embodiment of the present disclosure, the data corrector 920 may correct the other previous reference time information so as to have a value sequentially reduced by 1 based on the value of the first previous reference time information. For example, when the first to fifth previous reference time information are included in the caching stream data, and it is assumed that the first previous reference time information has a value of 1000, the data corrector 920 may correct the previous reference time information by sequentially reducing the values thereof by 1 such that the second previous reference time information has a value of 999, the third previous reference time information has a value of 998, the fourth previous reference time information has a value of 997, and the fifth previous reference time information has a value of 996.

The data transmitter 930 transmits, to the IPTV set-top box 220, the caching stream data having the corrected reference time information.

Figure 10:
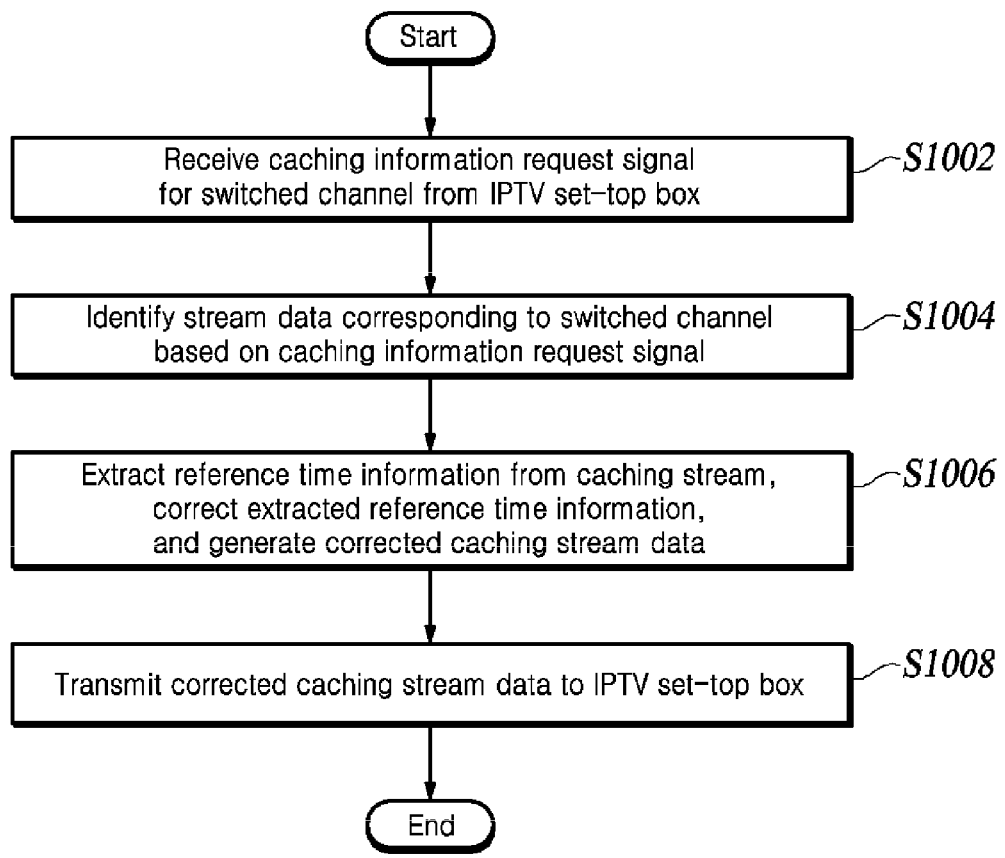
FIG. 10 is a flowchart illustrating a method of switching media service channels of the caching server according to the second embodiment of the present disclosure.

FIG. 10 is a flowchart illustrating a method of switching media service channels of the caching server according to the second embodiment of the present disclosure.

The caching server 230 receives a caching information request signal corresponding to a switched channel from the IPTV set-top box 220 (S1002). In operation S1002, the caching server 230 receives the caching information request signal containing channel information about the switched channel and packet information about broadcast data of the switched channel from the IPTV set-top box 220.

The caching server 230 calculates caching stream data corresponding to the switched channel based on the caching information request signal from operation S1002 (S1004). In operation S1004, the caching server 230 calculates data of a specific position section in the stream data corresponding to the switched channel as caching stream data at the time when the caching information request signal of operation S1002 is received or based on the packet information in the caching information request signal.

The caching server 230 extracts reference time information from the caching stream data calculated in operation S1004, corrects the extracted reference time information, and generates corrected caching stream data (S1006). In operation S1006, the caching server 230 corrects other previous reference time information in the caching stream data based on first previous reference time information nearest the end position of the caching stream data to generate the corrected caching stream data.

The caching server 230 transmits the corrected caching stream data of operation S1006 to the IPTV set-top box 220 (S1008).

Figure 11:
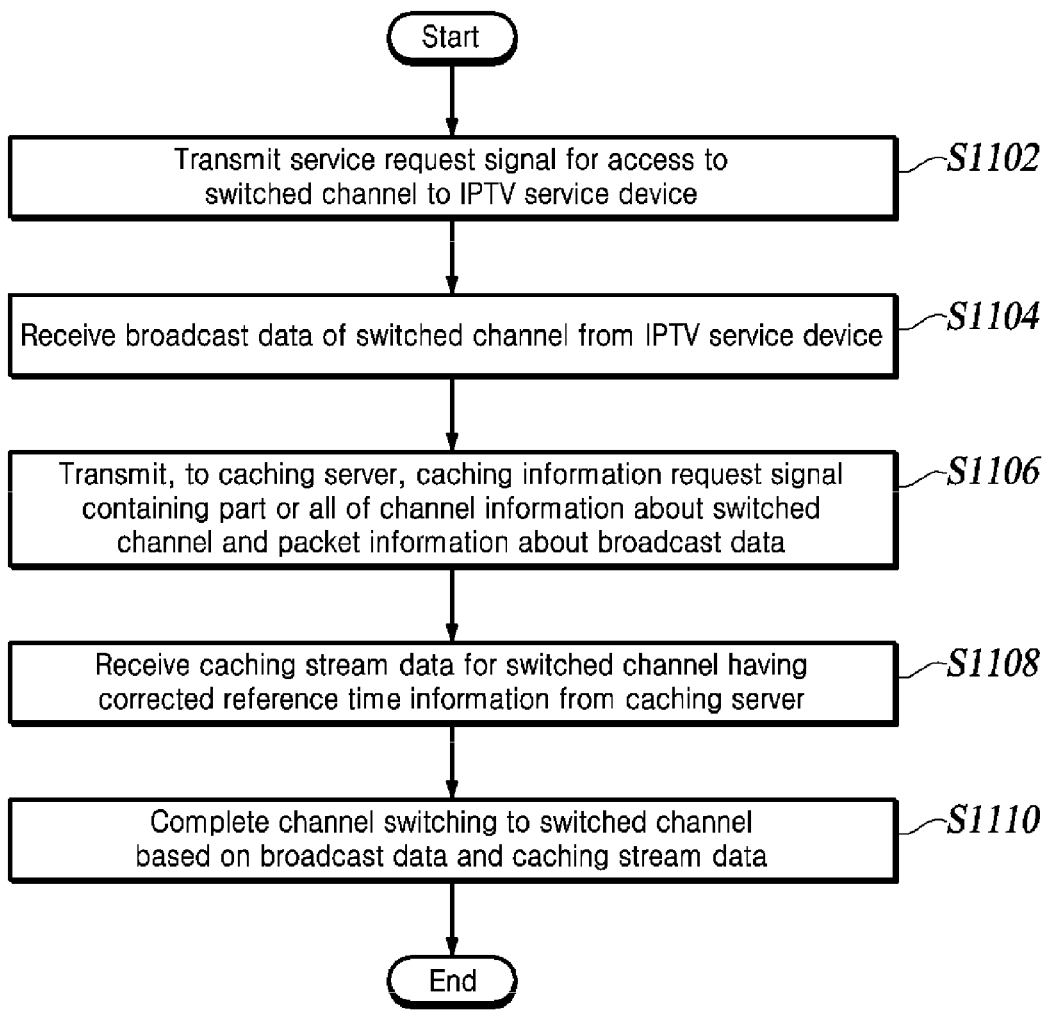
FIG. 11 is flowchart illustrating a method of switching media service channels of an IPTV set-top box according to a second embodiment of the present disclosure.

FIG. 11 is flowchart illustrating a method of switching media service channels of an IPTV set-top box according to a second embodiment of the present disclosure.

Upon recognizing a request for switching from a currently accessed channel to another channel, the IPTV set-top box 220 transmits a service request signal for access to the other channel to the IPTV service device 210 (S1102).

The IPTV set-top box 220 receives broadcast data of the switched channel from the IPTV service device 210 in response to the service request signal in operation S1102 (S1104).

The IPTV set-top box 220 transmits, to the caching server 230, a caching information request signal containing some or all of the packet information about the broadcast data received in operation S1104 and channel information about the switched channel (S1106). In operation S1106, the IPTV set-top box 220 may transmit the caching information request signal to the caching server 230 immediately upon receiving the broadcast data of the switched channel in operation S504.

The IPTV set-top box 220 receives caching stream data for the switched channel having the corrected reference time information from the caching server 230 in response to the caching information request signal in operation S1106

(S1108). In operation S1108, the IPTV set-top box 220 receives, from the caching server 230, the corrected caching stream data obtained by correct the other previous reference time information in the caching stream data based on the first previous reference time information nearest the end position of the caching stream data initially calculated according to the switched channel.

The IPTV set-top box 220 completes channel switching to the switched channel based on the broadcast data in operation S1104 and the caching stream data in operation S1108 (S1110).

Figure 12:
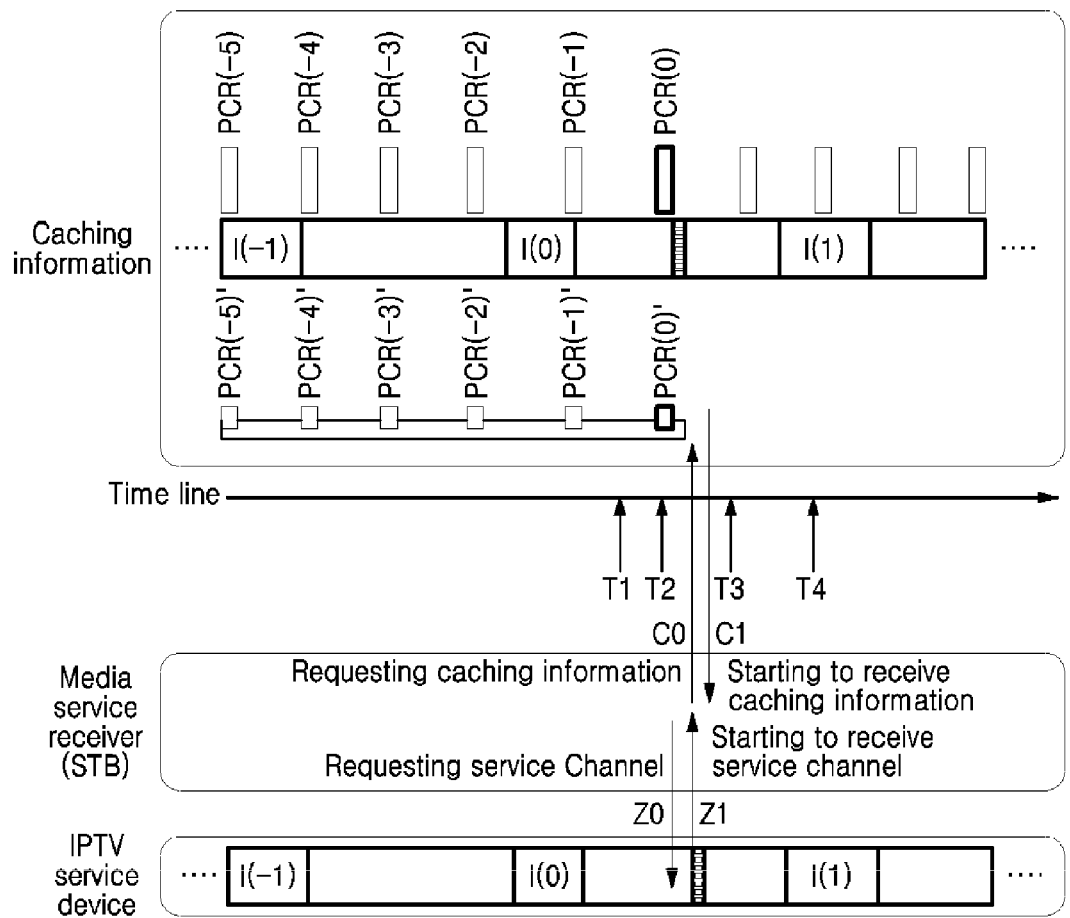
FIG. 12 is an exemplary diagram illustrating a method of switching media service channels according to a second embodiment of the present disclosure.

FIG. 12 is an exemplary diagram illustrating a method of switching media service channels according to a second embodiment of the present disclosure. In describing the media service channel switching method according to the second embodiment of the present disclosure, the method of generating caching stream data by the caching server 230 may be seen from FIGS. 7 and 8.

As shown in FIG. 12, once the start and end positions of the caching stream data are determined through the procedure of FIG. 7 or 8, the caching server 230 may extract the reference time information between the start and end positions, and then correct the values of the previous reference time information based on the previous reference time information PCR(0) nearest the end position. For example, the caching server 230 may correct the other previous reference time information such that other previous reference time information has values sequentially reduced by a specific value based on the value of the first previous reference time information (=PCR(0)).

Figure 13:
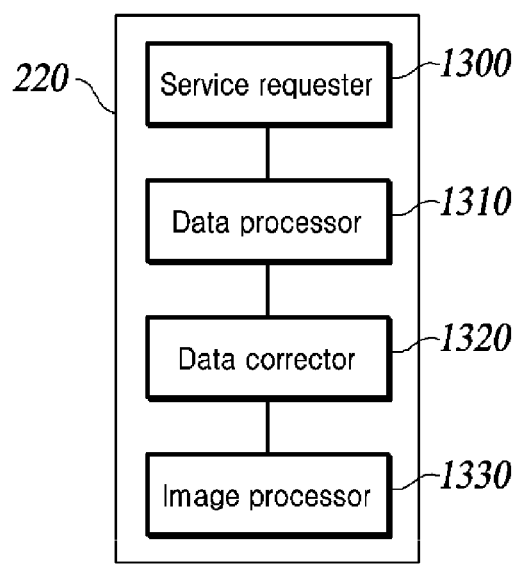
FIG. 13 is a block diagram schematically illustrating an IPTV set-top box according to a third embodiment of the present disclosure.

FIG. 13 is a block diagram schematically illustrating an IPTV set-top box according to a third embodiment of the present disclosure.

As shown in FIG. 13, the IPTV set-top box 220 according to the third embodiment of the present disclosure includes a service requester 1300, a data processor 1310, a data corrector 1320, and an image processor 1330. Here, the operations of the service requester 1300, the data processor 1310, and the image processor 1330 of the IPTV set-top box 220 according to the third embodiment of the present disclosure are the same as those of the service requester 300, the data processor 310, and the image processor 320 of the IPTV set-top box 220 according to the first embodiment of the present disclosure, and thus a detailed description thereof will be omitted.

The data corrector 1320 extracts reference time information from the caching stream data received through the data processor 1310 and corrects the extracted reference time information to generate corrected caching stream data.

In the present embodiment, the data corrector 1320 generates the corrected caching stream data by correcting the reference time information in the caching stream data based on the reference time information in the broadcast data received through the service requester 1300.

Hereinafter, a method of generating the corrected caching stream data by the data corrector 1320 by correcting the reference time information in the caching stream data based on the reference time information in the broadcast data will be described.

The data corrector 1320 receives broadcast data (=data after the time for the channel change request) and caching stream data (=data before the time for the channel change request) of the switched channel through the service requester 1300 and the data processor 1310, respectively at the same time, and the reference time information in the two received data is changed in the following way.

First, when there is reference time information (=PCR data) in the broadcast data of the switched channel sequentially received through the service requester 1300, the data corrector 1320 store the time t thereof and a data value (PCR value; hereinafter referred to as $M_{PCR}(t')$).

When there is reference time information in the caching stream data received after time t, the data corrector 1320 correct the data value of the initially calculated reference time information (hereinafter, referred to as $C_{PCR}(t')$) to a value equal to the data value of the reference time information in the broadcast data. That is, the data corrector 1320 corrects $C_{PCR}(t')$ to $M_{PCR}(t')$.

In correcting the reference time information in the caching stream data, the data corrector 1320 disables the reference time information in the broadcast data to block the IPTV set-top box 220 from referring to the reference time information. For example, the data corrector 310 may change $M_{PCR}(t')$ to a null value and then change the PCR flag to "0."

After receiving all the caching stream data, the data corrector 1320 disables the uncorrected reference time information which is not corrected in the reference time information in the caching stream data based on the reference time information in the broadcast data. For example, the data corrector 310 may change all the uncorrected reference time information to a null value, and then change the PCR flag to "0."

The image processor 1330 performs a subsequent operation for channel switching to the switched channel based on the broadcast data and caching stream data corrected by the data corrector 1320.

Figure 14:
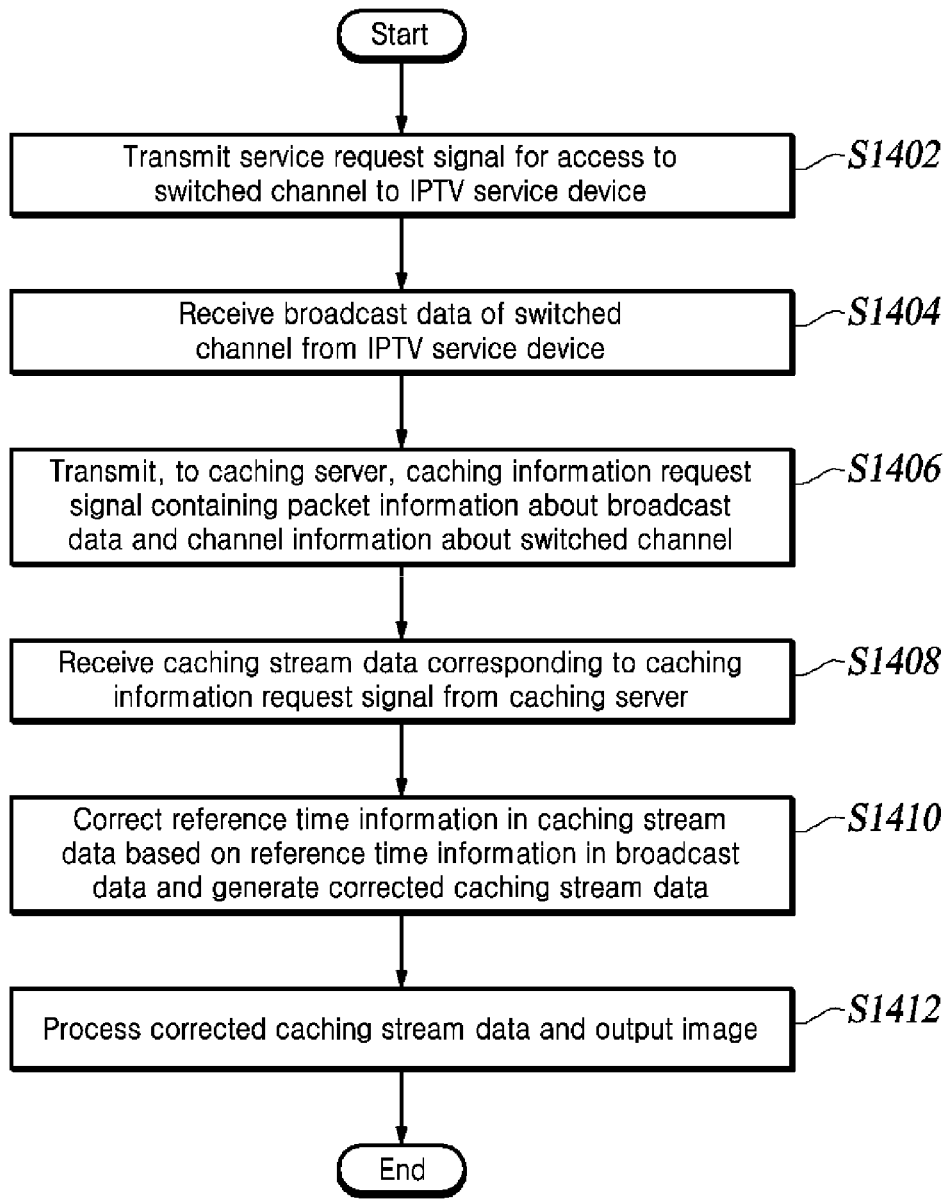
FIG. 14 is a flowchart illustrating a method of switching media service channels of the IPTV set-top box according to the third embodiment of the present disclosure.

FIG. 14 is a flowchart illustrating a method of switching media service channels of the IPTV set-top box according to the third embodiment of the present disclosure.

When a request for switching from a currently accessed channel to another channel is recognized, the IPTV set-top box 220 transmits a service request signal for access to the other channel (=switched channel) to the IPTV service device 210 (S1402).

The IPTV set-top box 220 receives broadcast data of the switched channel from the IPTV service device 210 in response to the service request signal of operation S1402 (S1404).

The IPTV set-top box 220 transmits, to the caching server 230, a caching information request signal containing packet information about the broadcast data and the channel information about the switched channel received in operation S1404 (S1406). In operation S1406, the IPTV set-top box 220 may transmit the caching information request signal to the caching server 230 immediately upon receiving the broadcast data of the switched channel in operation S1404.

In response to the caching information request signal of operation S1406, the IPTV set-top box 220 receives, as caching stream data, data ranging up to a specific position section determined based on the packet information among stream data corresponding to the switched channel from the caching server 230 (S1408). In operation S1408, the IPTV set-top box 220 receives caching stream data whose end position is an identical packet identical to the packet information and whose start position is an I frame immediately preceding the identical packet or an I frame preceding N (N≥1) frames from the immediately preceding I frame, in the stream data corresponding to the switched channel.

The IPTV set-top box 220 corrects the reference time information in the caching stream data of operation S1408 based on the reference time information in the broadcast data of operation S1404 to generate the corrected caching stream data (S1410). In operation S1410, the IPTV set-top box 220 corrects the reference time information in the caching stream data based on the reception time and data value of the reference time information in the broadcast data to generate the corrected caching stream data.

the IPTV set-top box 220 disables the reference time information of the broadcast data used in correcting the reference time information in the caching stream data, and the uncorrected reference time information in the caching stream data, thereby allowing generation of corrected caching stream data to be finally completed.

The IPTV set-top box 220 completes channel switching to the switched channel based on the broadcast data corrected in operation S1410 and the corrected caching stream data (S1412).

Figure 15:
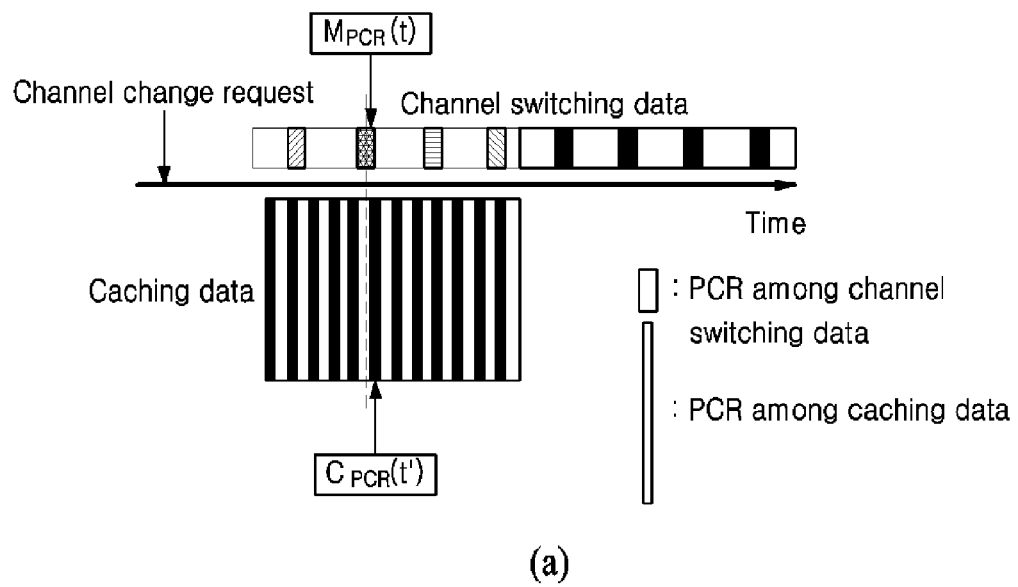
FIG. 15 is an exemplary diagram illustrating a method of switching media service channels according to the third embodiment of the present disclosure.
Figure 15:
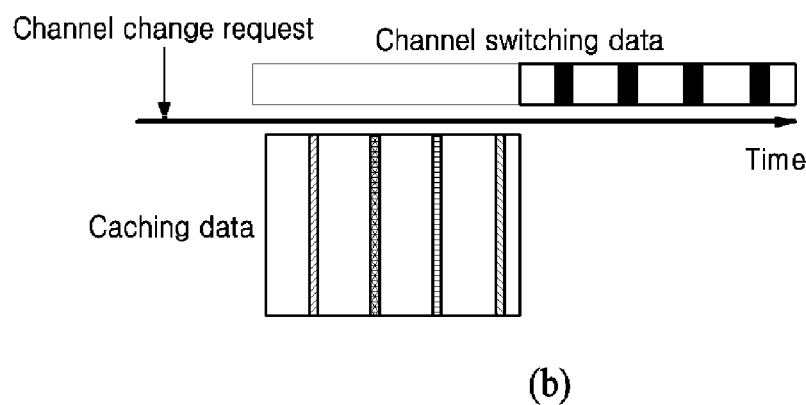

FIG. 15 is an exemplary diagram illustrating a method of switching media service channels according to the third embodiment of the present disclosure. In describing the media service channel switching method according to the third embodiment of the present disclosure, a method of generating caching stream data by the caching server 230 may be seen from FIGS. 7 and 8.

As shown in FIG. 15, in the third embodiment of the present disclosure, the IPTV set-top box 220 generates corrected caching stream data by correcting reference time information in the caching stream data based on the reception time and data value of the reference time information in the broadcast data of a switched channel sequentially received from the IPTV service device 210.

For example, referring to FIG. 15(a), the IPTV set-top box 220 may correct the data value of the initially calculated reference time information in the caching stream data received after the reception time to be equal to the data value of the reference time information in the broadcast data.

In addition, referring to FIG. 15(b), the IPTV set-top box 220 disables the reference time information in the broadcast data used in correcting caching stream data. After all the caching stream data is received, the uncorrected reference time information that has not been corrected in the caching stream data may be disabled. Thereby, the correction operation for the caching stream data is finally completed.

Figure 16:
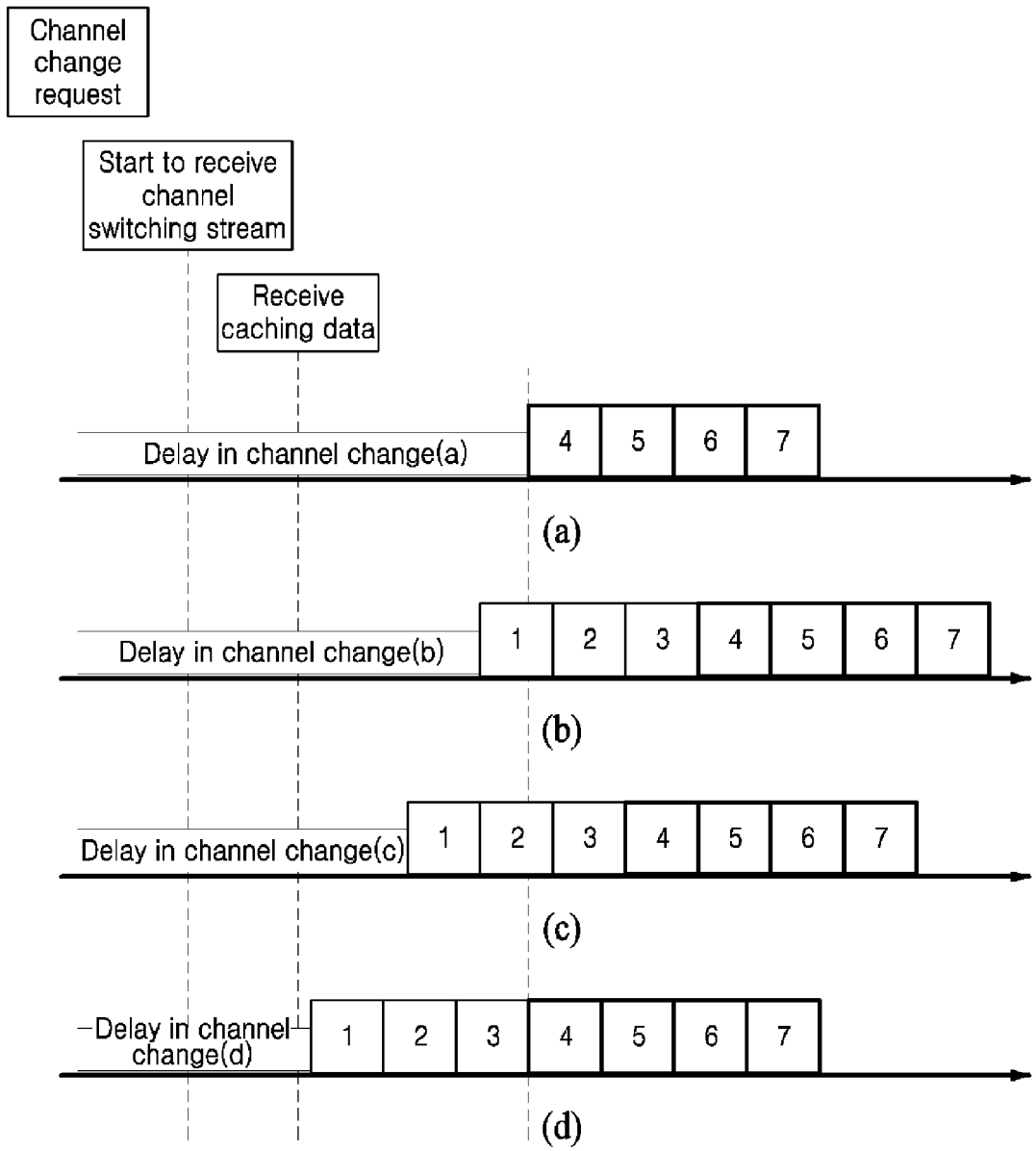
FIG. 16 is a comparison diagram for explaining the effect of the method for switching media service channels according to the third embodiment of the present disclosure.

FIG. 16 is a comparison diagram for explaining the effect of the method for switching media service channels according to the third embodiment of the present disclosure.

FIG. 16(a) illustrates a delay in channel change in the case of a conventional channel change method. FIG. 16(b) illustrates delay in channel change in the case of a channel change method employing a caching server (e.g., the media service channel switching method according to the first embodiment of the present disclosure). FIG. 16(c) illustrates a delay in channel change when a caching server is used, but the reference time information in the caching data is modified in the caching server (e.g., the media service channel switching method according to the second embodiment of the present disclosure). FIG. 16(d) illustrates a delay in channel change in the media service channel switching method according to the third embodiment of the present disclosure.

Referring to FIG. 16, with the media service channel switching method according to the third embodiment of the present disclosure, the channel switching by an IPTV user may be quickly performed without unnecessary waiting time, and the issue of screen shifting raised by the conventional methods is also addressed. Here, screen shifting refers to an effect of outputting past data provided before the time of channel change.

In addition, with the media service channel switching method according to the third embodiment of the present disclosure, channel switching may be performed quickly, and the same screen synchronization as the conventional channel switching method may be maintained.

That is, with the channel switching methods in FIGS. 16(c) and 16(d), the time required for channel switching is shortened compared to the conventional channel switching method in FIG. 16(a), but past data given before the time of channel change is derived, thereby raising the issue of shifting. On the other hand, with the channel switching method according to the third embodiment of the present disclosure, the reference time information in the caching stream data is corrected based on the reference time information in the broadcast data of the switched channel. Accordingly, the same screen synchronization as the conventional channel switching method may be maintained, thereby, shortening the delay time of channel switching and addressing the issue of presentation of past data.

In describing the method for switching media service channels according to the present disclosure, the operations in FIGS. 5, 6, 10, 11, and 14 have been described as being sequentially executed. However, embodiments are not necessarily limited thereto. In other words, the operations described in FIGS. 5, 6, 10, 11, and 14 may be executing in a different order, or one or more thereof may be executed in parallel. Accordingly, FIGS. 5, 6, 10, 11, and 14 are not limited to a time series order.

As described above, the media service channel switching method described in FIGS. 5, 6, 10, 11, and 14 may be implemented as a program and recorded on a recording medium (CD-ROM, RAM, ROM, memory card, hard disk, magneto-optical disk, storage device, etc.) that is readable with computer software.

Although exemplary embodiments of the present disclosure have been described for illustrative purposes, those skilled in the art will appreciate that various modifications, additions and substitutions are possible, without departing from the spirit and scope of the appended claims. Therefore, the present disclosure is to be construed as illustrative rather than limiting, and the scope of the present disclosure is not limited by the embodiments. The scope of protection of the disclosure should be construed according to the appended claims, and all technical ideas within the scope of the claims and equivalents thereto should be construed as being within the scope of the disclosure.

What is claimed is:

1. A method of switching channels by a set-top box, the method comprising:
when a request signal for switching to a switching target channel is received, transmitting a service request signal for access to the switching target channel to an IPTV service device by the set-top box;
receiving broadcast data of the switching target channel from the IPTV service device in response to the service request signal;
transmitting, to a caching server, a caching information request signal containing packet information about the broadcast data initially received from the IPTV service device and channel information about the switching target channel;
receiving, by the set-top box, caching stream data corresponding to the packet information and the channel information from the caching server in response to the caching information request signal; and
receiving, by the set-top box, corrected caching stream data by (i) correcting reference time information in the caching stream data based on reference time information in the broadcast data, and (ii) reducing values of other previous reference time information preceding the reference time information sequentially by a specific value that depends on an amount of transferred data and a transmission time of the caching stream data, the corrected caching stream generated by the caching server.

2. The method of claim 1, wherein, in the transmitting to the caching server, the caching information request signal is transmitted to the caching server when the broadcast data of the switching target channel from the IPTV service device starts to be received.

3. The method of claim 1, wherein the packet information about the broadcast data comprises a part or all of initial N bytes information of the broadcast data received from the IPTV service device, feature information about initially received packet data, and packet connection number information.

4. The method of claim 1, wherein the receiving of the caching stream data comprises:
receiving, from the caching server, the caching stream data whose end position is a packet identical to the packet information among packets in the stream data corresponding to the channel information.

5. The method of claim 4, wherein the receiving of the caching stream data comprises:
receiving, from the caching server, the caching stream data whose start position is an I frame immediately preceding the identical packet or an I frame preceding N (N≥1) frames from the immediately preceding I frame.

6. The method of claim 1, wherein the corrected caching stream data is generated by disabling the reference time information in the broadcast data used in correcting the reference time information in the caching stream data.

7. The method of claim 1, wherein the corrected caching stream data is generated, after receiving all the caching stream data, by disabling uncorrected reference time information in the reference time information in the caching stream data, the uncorrected reference time information not being corrected based on the reference time information in the broadcast data.

8. A set-top box comprising:
a processor; and
memory coupled to the processor and storing instructions that cause the processor to:
transmit a service request signal for access to a switching target channel to an IPTV service device,
receive broadcast data of the switching target channel from the IPTV service device in response to the service request signal,
transmit, to a caching server, a caching information request signal containing packet information about the broadcast data initially received from the IPTV service device and channel information about the switching target channel,
receive caching stream data corresponding to the packet information and the channel information from the caching server, and
receive corrected caching stream data by (i) correcting reference time information in the caching stream data based on reference time information in the broadcast data, and (ii) reducing values of other previous reference time information preceding the reference time information sequentially by a specific value that depends on an amount of transferred data and a transmission time of the caching stream data, the corrected caching data generated by the caching server.

9. A non-transitory computer readable storage medium in a set-top box, the medium storing instructions thereon, the instructions when executed by a processor cause the processor to perform operations of:
when a request signal for switching to a switching target channel is received, transmitting a service request signal for access to the switching target channel to an IPTV service device;
receiving broadcast data of the switching target channel from the IPTV service device in response to the service request signal;
transmitting, to a caching server, a caching information request signal containing packet information about the broadcast data initially received from the IPTV service device and channel information about the switching target channel;
receiving caching stream data corresponding to the packet information and the channel information from the caching server in response to the caching information request signal;
processing the caching stream data and outputting an image; and
receiving corrected caching stream data by (i) correcting reference time information in the caching stream data based on reference time information in the broadcast data, and (ii) reducing values of other previous reference time information preceding the reference time information sequentially by a specific value that depends on an amount of transferred data and a transmission time of the caching stream data, the corrected caching data generated by the caching server.

* * * * *